United States Patent
Howard et al.

(10) Patent No.: US 8,369,212 B2
(45) Date of Patent: Feb. 5, 2013

(54) NETWORK PATH VALIDATION BASED ON USER-SPECIFIED CRITERIA

(75) Inventors: Gregory T. Howard, Austin, TX (US); Michael Sean McGee, Austin, TX (US); Jeffrey D. Allen, Norcross, GA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1334 days.

(21) Appl. No.: 11/512,460

(22) Filed: Aug. 29, 2006

(65) Prior Publication Data
US 2008/0056123 A1    Mar. 6, 2008

(51) Int. Cl.
*H04J 3/14* (2006.01)
(52) U.S. Cl. .......................................... 370/225
(58) Field of Classification Search .................. 370/217, 370/218, 219, 220, 221
See application file for complete search history.

(56) References Cited

U.S. PATENT DOCUMENTS

| | | | | |
|---|---|---|---|---|
| 5,974,457 A * | 10/1999 | Waclawsky et al. | ........... | 709/224 |
| 6,363,477 B1 * | 3/2002 | Fletcher et al. | ............... | 713/151 |
| 6,556,547 B1 * | 4/2003 | Srikanth et al. | ............... | 370/317 |
| 6,728,748 B1 * | 4/2004 | Mangipudi et al. | ........... | 718/105 |
| 6,728,780 B1 * | 4/2004 | Hebert | ............... | 709/239 |
| 7,304,984 B2 * | 12/2007 | Butler et al. | ................ | 370/352 |
| 7,321,992 B1 * | 1/2008 | Vellore et al. | ................ | 714/47 |
| 7,330,444 B1 * | 2/2008 | Pasqua | ........................ | 370/282 |
| 7,480,725 B2 * | 1/2009 | Krajewski et al. | ........... | 709/229 |
| 2003/0014684 A1 | 1/2003 | Kashyap | | |
| 2003/0058880 A1 | 3/2003 | Sarkinen et al. | | |
| 2004/0264481 A1 | 12/2004 | Darling et al. | | |
| 2004/0268118 A1 | 12/2004 | Bazan Bejarano | | |
| 2005/0010838 A1 | 1/2005 | Davies et al. | | |
| 2005/0022064 A1 | 1/2005 | Steinmetz et al. | | |
| 2005/0055435 A1 | 3/2005 | Gbadegesin et al. | | |
| 2005/0066060 A1 | 3/2005 | Pinkerton et al. | | |
| 2005/0080895 A1 | 4/2005 | Cook et al. | | |
| 2005/0172161 A1 | 8/2005 | Cruz et al. | | |
| 2005/0270980 A1 | 12/2005 | McGee | | |
| 2005/0281190 A1 | 12/2005 | McGee et al. | | |
| 2005/0281191 A1 | 12/2005 | McGee et al. | | |
| 2006/0002292 A1 | 1/2006 | Chang et al. | | |
| 2006/0029097 A1 | 2/2006 | McGee et al. | | |
| 2006/0036893 A1 * | 2/2006 | Anglin et al. | ................ | 714/4 |
| 2006/0039385 A1 * | 2/2006 | Bare et al. | ................ | 370/400 |
| 2006/0053330 A1 | 3/2006 | Pomaranski et al. | | |
| 2006/0056285 A1 * | 3/2006 | Krajewski et al. | ............. | 370/216 |
| 2007/0226803 A1 * | 9/2007 | Kim et al. | ...................... | 726/24 |

* cited by examiner

*Primary Examiner* — Mark Rinehart
*Assistant Examiner* — Mohammad Anwar (57) ABSTRACT

A method of operating a network computer system to manage failover in the network computer system comprising communicating traffic via the plurality of network resources, and failing over from a primary pathway to a secondary pathway of the pathway plurality based on failure to receive the user-specified traffic defined by the failover criteria in the primary pathway in combination with availability of the user-specified traffic via the secondary pathway.

10 Claims, 7 Drawing Sheets

NETWORK PATH VALIDATION BASED ON USER-SPECIFIED CRITERIA

BACKGROUND

A network is most useful if connections, such as links between clients and network servers, are reliable and network devices, for example servers, can quickly receive and respond to numerous incoming requests from clients or other devices on the network. As processing speeds increase and memory access time decreases in servers and other network devices, throughput at device interfaces to the network can become a bottleneck. Network reliability and throughput can be improved by coupling some or all of the network devices to the network through redundant network resources. Redundant network links may be formed using multiple single-port Network Interface Controllers (NICs), one or more NICs each having more than one port, or a combination of single and multiple port NICs. Network interface resources can be teamed to improve throughput and reliability. Resource teams typically include two or more NICs, or two or more NIC ports, which are logically coupled in parallel to appear as a single virtual network adapter to the other network devices. Resource teams can supply aggregated throughput of data to and from a network device employing the team and/or fault tolerance with resource redundancy enabling an increase in reliability.

Fault tolerant teams of network resources can employ two or more network adapter or NIC ports with one port "active" and configured to operate as a "primary," and other members of the team designated as "secondary" and configured to operate in a "standby" mode. A NIC or NIC port in standby mode is usually idle. Typically activity may be limited to an extent sufficient to respond to system test inquiries or heartbeats which indicate to the team that the NIC or port remains operational. The NIC or port in standby may be activated to replace the primary adapter upon failure. Thus, interruption of a network connection to a critical server may be avoided notwithstanding the existence of a failed network adapter card or port.

Failover is a capability to switch automatically to a secondary resource, typically a redundant or standby network resource, upon failure or abnormal termination of a previously active primary resource.

SUMMARY

An embodiment of a method for operating a network computer system manages failover in the network computer system. Traffic is communicated via a plurality of network resources and fails over from a primary pathway to a secondary pathway of the pathway plurality based on failure to receive the user-specified traffic defined by the failover criteria in the primary pathway in combination with availability of the user-specified traffic via the secondary pathway.

BRIEF DESCRIPTION OF THE DRAWINGS

Embodiments of the invention relating to both structure and method of operation may best be understood by referring to the following description and accompanying drawings.

DETAILED DESCRIPTION

Network path validation can be based on packet criteria that are specified by a user.

Current network adapter failover technology limits a user to failovers based on the absence of "heartbeat" multicast frames or other generic traffic. However, in some network adapter teaming scenarios, failover can be made more useful by adding flexibility to adapt to the absence of specific user-defined traffic. A system illustrated herein describes a structure and technique that enables users to specify not only various types of well-known traffic to be used as heartbeats, or absence of the signal to indicate failure, but also inclusion of a method to enable user specification of any multicast address that can be used as a heartbeat.

A network adapter teaming system enables users to "listen" for heartbeats on a network wire. Heartbeats supply an indication to an intermediate teaming driver that a specific network adapter maintains full functionality. A typical implementation forces the network adapters to listen to a specific multicast address for a heartbeat, in absence of other traffic, or listen to any incoming frames that are transmitted on the wire. Specifically, any incoming frames are currently considered as a valid receipt and the adapter is marked as valid for receives.

Servers under the Windows operating system and other network devices, including switches and routers, periodically send out traffic such as Secure Transfer Protocol (STP), routing protocol updates, and the like, that are sent to all devices on the subnet. Accordingly, any server with a team that is connected to the switches will receive network traffic and therefore be marked as valid for receives.

The typical implementation can create problems when multiple servers are connected to the same switch and may have to failover to a different switch if a specific type of traffic is absent, a situation that does create failover. Failover does not occur because the network team continues to detect traffic from the switches in the form of STP, team heartbeat frames, and other similar signals. A typical example configuration may be a server using two adapters connected across two different switches using a Network Fault Tolerant (NFT) or Transmit Load Balancing (TLB) team type. The fact that both adapters maintain a link and continue to receive some traffic prevents occurrence of a desired failover. NFT and TLB are described in detail in Sean Michael McGee, U.S. Patent Application Publication No. 20050270980, entitled "Automated selection of an optimal path between a core switch and teamed network resources of a computer system"; McGee et al., U.S. Patent Application Publication No. 20050281190, entitled "Automated recovery from a split segment condition in a layer 2 network for teamed network resources of a computer system"; McGee et al., U.S. Patent Application Publication No. 20050281191, entitled "Monitoring path connectivity between teamed network resources of a computer system and a core network"; and McGee et al., U.S. Patent Application Publication No. 20060029097, entitled "Dynamic allocation and configuration of a computer system's network resources"; which are incorporated by reference herein in their entirety.

Various failover systems implement techniques such as receiving heartbeats, for example a specific multicast MAC address, simply receiving traffic on an adapter, or receiving a reply from a designated "echo node" in response to an Address Resolution Protocol (ARP) request generated by the team. Each of the techniques enables a path to be validated for the server team, but each also has limitations. For example, regular heartbeats are specific and hard-coded. A user cannot modify the heartbeats to distinguish different types of traffic.

Receipt of traffic on an adapter to signal path validity may not be a desired behavior if the user wants to remain connected to a specific path only as long as a specific traffic type such as IGMP is present, otherwise the path is not valid and failover is desired and the traffic type is present on another team member.

Figure 5:
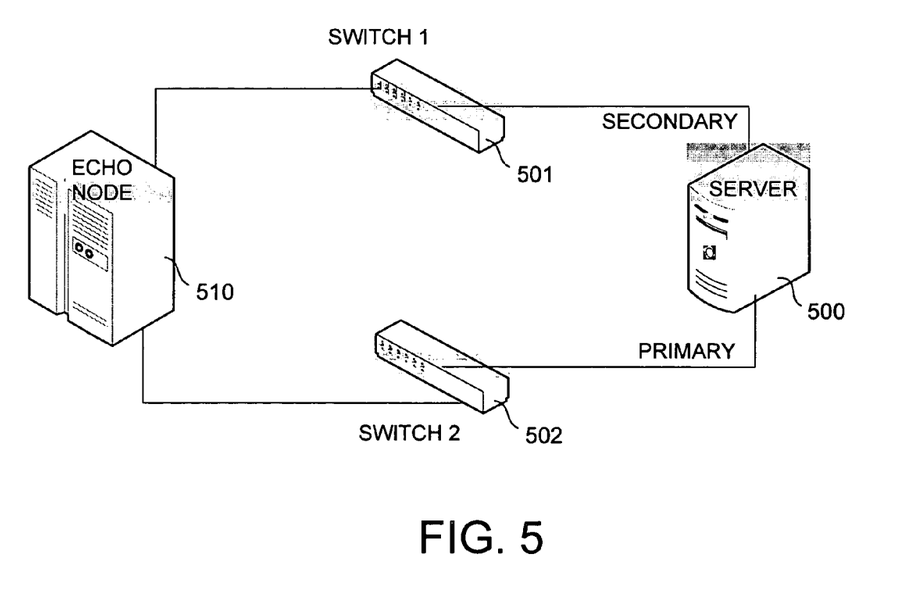
FIG. 5 is a schematic block diagram showing an echo node device split across two subnets without an Inter-Switch Link (ISL).

Use of an "echo node" presumes that a device in the network is capable of responding to a directed ARP and that the device will respond to the team member on a correct subnet for the device that is connected to two or more different subnets. For example, referring to FIG. 5, absence of an Inter-Switch Link (ISL) between switches 501 and 502 can create problems due to a disconnect in layer 2 communication, a data link layer known as a Media Access Control (MAC) address. An echo node 510 can be any device capable of responding to a directed ARP, and is not limited to an echo node 510 for a server 500, as shown.

A proposed technique validates a network path based on user-specified criteria. The proposed technique avoids a requirement for usage of an echo node for the case of a directed ARP, since the team monitors for specified user traffic as failover criteria.

Figure 1:
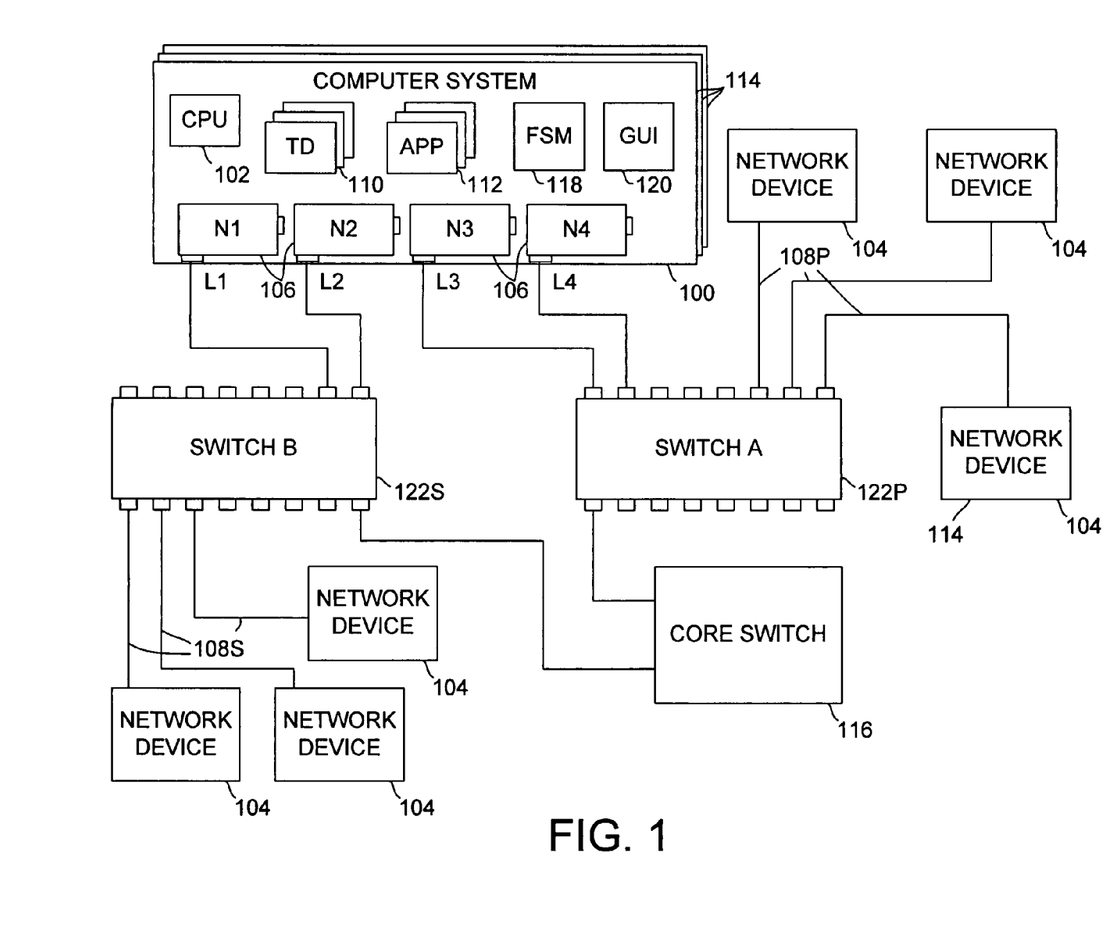
FIG. 1 is a schematic block diagram showing an embodiment of a computer system that can perform network path validation based on user-specified criteria.

Referring to FIG. 1, a schematic block diagram illustrates an embodiment of a computer system 100 that can perform network path validation based on user-specified criteria. The illustrative computer system 100 and associated operating method address the inability to failover in the described circumstances by allowing a user to disable regular heartbeats and monitor for absence of a specific frame type that is selected by the user. In absence of the specific frame type, the system fails over to a network pathway that continues to communicate the frame type. The illustrative computer system 100 comprises one or more processing resources 102 configured to control and communicate with one or more network devices 104 and a plurality of network resources 106 which are coupled by a plurality of pathways 108P,108S between the processing resources 102 and the network device 104. Teaming drivers 110 and/or applications 112 are executable on the processing resources 102 and manage failover in the network computer system 100. The teaming drivers 110 or applications 112 communicate traffic over the network resources 106 and fail over from a primary pathway 108P to a secondary pathway 108S based on a condition of a failure to receive the user-specified traffic defined by the failover criteria in the primary pathway 108P in combination with availability of the user-specified traffic via the secondary pathway 108S.

The teaming drivers 110 and applications 112 present multiple different traffic types that specify a heartbeat showing the presence or absence of a signal indicating failure in at least one of the pathways 108P,108S and enables a user to select from among the different traffic types. For example, the teaming drivers 110 and applications 112 can enable a user to selectively specify a multicast address for usage as the heartbeat.

In an example operation, the teaming drivers 110 and/or applications 112 can manage failover in a network computer system 100 that includes multiple servers 114 connected to a core switch 116, which is part of the network resources 106. The teaming drivers 110 and/or applications 112 can monitor for absence of a user-specified traffic at the core switch 116 in combination with presence of the user-specified traffic at one or more switches 122P, 122S, and manage failover from the core switch 116 to a switch 122P, 122S that is selected based on user-specified criteria.

Some embodiments may implement a finite state machine 118 that is configurable by a user and executes a multiple-variant analysis to select a secondary pathway 108S from among multiple potential pathways for failover from the primary pathway 108P.

The specific frame type for failover monitoring can be selected using a graphical user interface (GUI) such as a Network Adapter Teaming GUI. In some implementations, the specific frame type can be a frame type of a particular protocol, such as Internet Group Management Protocol or others, or can be a user-specified pattern, such as a special user-defined multicast Media Access Control (MAC) address. User selection of the monitored traffic type enables a proper failover of a team to maintain connectivity based on a user-defined packet criteria, such as a MAC address. The computer system 100 may also include a graphical user interface (GUI) 120 which is executable on the one or more processing resources 102 and configured to specify a hierarchy of user-specified traffic that is defined by the failover criteria. The user-selected traffic hierarchy determines which secondary pathway 108S is imposed from multiple secondary pathways that are eligible for failover. The GUI 120 is depicted as executed within the server for illustrative purposes and may in other configurations be executed on a management system that is separate from the server. The GUI 120 can be used to make selections for an entire server group or farm.

In the illustrative configuration, network resources 106 include multiple Network Interface Controllers (NICs) that enable the computer system 100 to communicate through one or more ports with other network devices 104 to which NIC ports are coupled. Computer system 100 may be connected to at least as many networks as the number of NICs or NIC ports 106. Multiple NICs or NIC ports 106 are can be coupled to the same network as a team, each supplying a separate and redundant link to the same network for operations such as load balancing and/or fault tolerance. In some arrangements, two or more NICs or NIC ports 106 can be split between distinct paths or segments of a network that ultimately connect to the single core switch 116.

In a packet-switched network, individual NICs 106 transmit and receive packets such as Ethernet™ or other formatted packets from the network. The packets are generated by processing resources (not shown) of a transmitting network device 104. Packet formatting is defined by a selected transmission protocol. Individual network devices 104 use one or more unique addresses for communication with other network devices 104. An address corresponds to one of the layers of the Open Source Initiative (OSI) model and is embedded in the packets for both a source device and a destination device. Typically, a device uses an address at layer 2, the MAC address data link layer, and an address at layer 3, a network layer known as a protocol address such as Internet Protocol (IP), Inter network Packet exchange (IPX), AppleTalk and the like. The MAC address can be considered as assigned to physical hardware of the device, for example the adapter or NIC port supplying a link to the network. In contrast, the protocol address is assigned to device software. When multiple protocols reside on the same network device, a protocol address is usually assigned to each resident protocol.

For Ethernet™ networks, devices communicate directly using respective MAC addresses, although software for individual devices initiate communication with one or more other network devices 104 using the protocol addresses. Ethernet™ devices first ascertain the MAC address corresponding to a particular protocol address identifying a destination device, for IP protocol by first consulting a cache of MAC address/protocol address pairs maintained by each network device. If an entry for a particular protocol address is missing, a process is initiated whereby the sending device broadcasts a request to all devices on the network for the device having the destination protocol address to send back the MAC address, an operation called Address Resolution Protocol (ARP), with the result stored in the cache. Packets are formed by embedding source and destination addresses, and by embedding the source and destination protocol addresses in a packet payload enabling the receiving device to respond to the correct source. IPX protocol does not require the ARP process because the MAC address is included in the IP address.

Three types of layer 2 and layer 3 addresses exist. A directed or unicast packet includes a specific destination address that corresponds to a single network device. A multicast address corresponds to multiple but not all devices on a network. A broadcast address, for example as used in the ARP process, corresponds to all devices on the network. A broadcast bit is set for broadcast packets, where the destination address is all ones. A multicast bit in the destination address is set for multicast packets.

The illustrative layer 2 network includes two contiguous paths 108P and 108S to core switch 116. Computer system 100 communicates with one or more other devices through a switch 122P over path 108P and other network devices through a switch 122S over path 108S. The network devices may be of any type, such as another computer system, a printer or other peripheral device, any type of network device, such as a hub, a repeater, a router, and the like. Multiple port switches 122S, 122P can be a concentrator, hub, switch or the like.

Computer system 100 is shown coupled to ports of the network device switch 122P by way of links L3 and L4. The computer system 100 is also shown coupled to the network device switch 122S via links L1 and L2. NICs 106 are shown to supply one NIC port, and thus one link, for each NIC. NICs may otherwise be multi-port devices or a combination of both single and multi-port NICs. Computer system 100 may be coupled to the network devices via any number of links from one to some maximum number such as sixteen, primarily limited by the number of expansion slots available.

Teamed interface resources in computer system 100 can supply two or more redundant links to the contiguous network segment that includes two paths 108P, 108S to a core switch 116 through redundant switches 122P and 122S respectively. In the example members of a team, for example ports for NICs N1-N4, are equally divided between the two paths of the segment. The team of ports or NICs N1-N4 can perform operations such as load balancing and/or fault tolerance, depending upon whether the team is configured to be a TLB or NFT team respectively. Teaming of two or more NIC ports can be configured to make the team perform like a single virtual interface resource or virtual port to the other devices on the same network or sub-network, for example by assigning one primary MAC address and one protocol address to the entire team.

Figure 2:
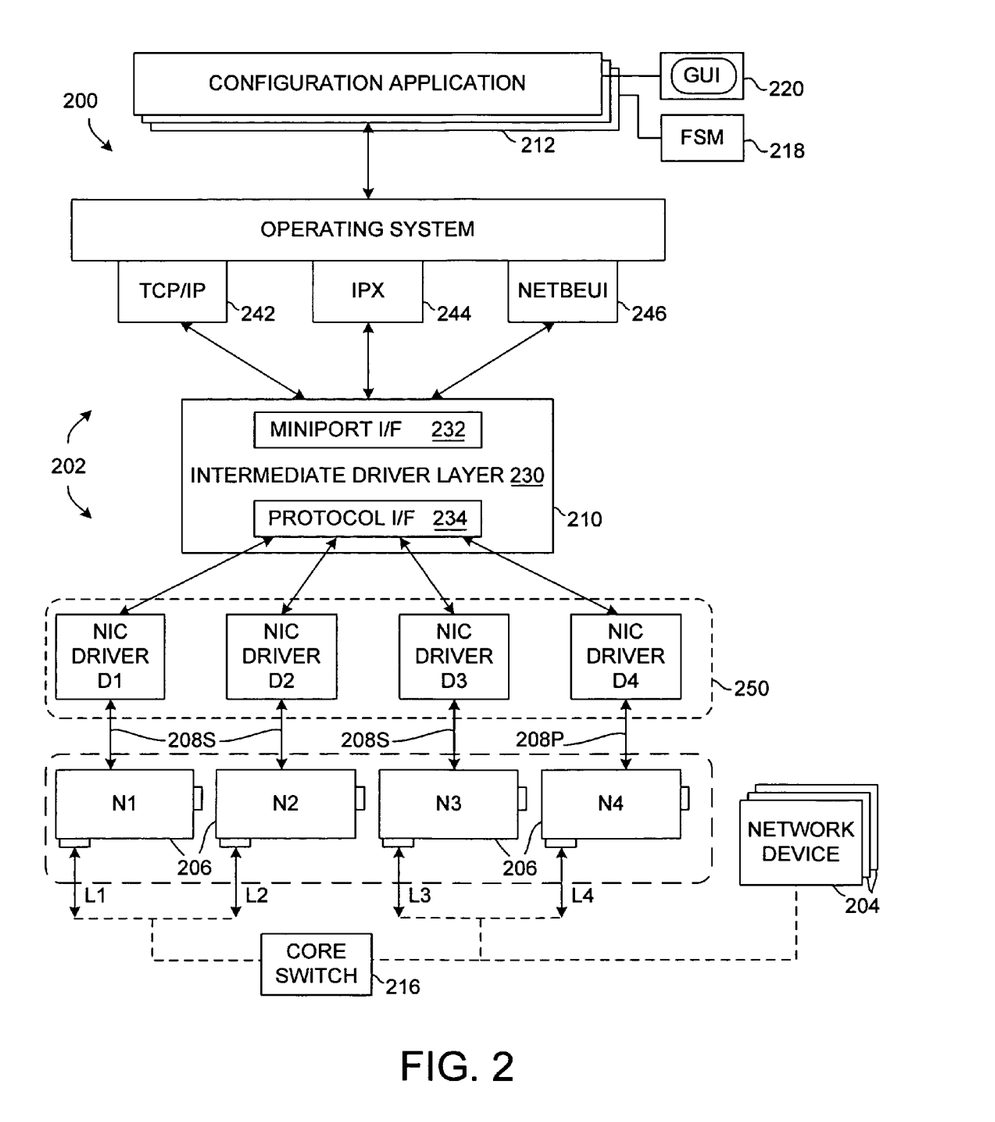
FIG. 2 is a schematic block diagram illustrating an embodiment of a computer system that uses a graphical user interface to configure user-specified failover criteria for usage in network path validation.

Referring to FIG. 2, a schematic block diagram illustrates an embodiment of a computer system 200 that uses a graphical user interface 220 to configure user-specified failover criteria for usage in network path validation. The illustrative computer system 200 comprises processing resources 202 which are configured to control and communicate with one or more network devices 204 and multiple network resources 206 which are coupled by pathways 208P, 208S between the processing resources 202 and the network device 204. The graphical user interface (GUI) 220 is executable on the processing resources 202 and is configured to specify a hierarchy of user-specified traffic that are defined by the failover criteria for directing teaming drivers 210 and/or applications 212 to manage failover from a primary pathway 208P to a secondary pathway 208S. The hierarchy determines which secondary pathway 208S from among possibly multiple secondary pathways is chosen for failover.

The graphical user interface (GUI) 220 can be configured to direct a user to select the failover criteria from among one or more of multiple sets of user-defined criteria. In an illustrative embodiment, the user-defined criteria sets can selected from among several sets including predefined traffic types, EtherType indicative of an incoming traffic type that satisfies a receive test, input Internet Protocol (IP) addresses, input Media Access Control (MAC) addresses, maximum frame size, and minimum frame size.

The computer system 200 can further comprise a finite state machine 218 that can be configured by a user using the graphical user interface (GUI) 220 that executes a multiple-variant analysis based on the user-defined criteria to select a particular secondary pathway from among multiple possible secondary pathways 208S for failover from the primary pathway 208P.

The teaming driver 210 typically executes teaming software that implements the finite state machine 218 and analyzes various selected failure criteria for the team to determine whether to make an intelligent failover decision. One aspect of finite state machine analysis can be detection of a link failure which may include analysis of the particular type of failure and determination of a particular action in response to the failure. Various types of link failures may include unplugging of a cable between adapter and switch, severing of a wire, electrical failure of type, failure in a receive port on the switch, failure in a NIC port, other type of hardware failure. In some embodiments, the finite state machine 218 may be configured to handle other types of failures such as failures in software or in relatively remote parts of the network that can cause problems and break network connectivity. Accordingly, the finite state machine 218 may be implemented with additional intelligence for detection of a wide range of failures, enabling responses tailored to the particular failure.

The finite state machine 218 can be configured to take into consideration various aspects of teaming operation, such as team type, transmit load balancing, switch-assisted load balancing, fault tolerance, and the like, in decision making. For example, the GUI 220 can enable a user to select various well-defined traffic types from a drop-down menu including multiple sets of user-defined criteria. The user can outline parameters for defining a specific type of traffic for which connectivity is to be maintained.

The finite state machine 218 can enable the user to tailor network path validation to operating characteristics of the network and teaming configuration. For example, if IGMP software is installed, the user can enable an echo node via the GUI 220 and define an IP address which enables the team to periodically send a pseudo-heartbeat, an op request that requests a reply to a specific node that is defined by the user. The pseudo node can be enabled to reply back to the pseudo-heartbeat, thereby validating connectivity through particular selected network resources such as switches, routers, and servers. Prompts to direct selection of paths for which connectivity is validated can be user-definable through the GUI 220.

The finite state machine 218 can make decisions based on path costs, for example using a spanning tree through which switches exchange information about link costs to link to a core switch. For example, a gigabit connection may be assigned a link cost of 4 as defined by Institute of Electrical and Electronics Engineers (IEEE) standards under IEEE 802. A 100 Mbit link is assigned a cost of 19. Each switch tallies the cost to link to the core switch and pass the tally downstream. Intelligence in the teaming driver 210 can monitor the link cost information passively and determine based on NIC type and information coming from an edge switch what the link cost is to link back to the core switch. A relatively better path to the core switch 216 can thus be determined based on link costs. For example, the user can use the GUI 220 to request connectivity to the core switch 216 using the path which is fastest and best with lowest cost. In the event of a failure in the requested pathway, the finite state machine 218 can perform analysis to determine a next-best pathway for failover. If one potential secondary pathway is fastest of the remaining pathways and another potential secondary pathway has lowest cost, the finite state machine 218 may be configured using the GUI 220 to select between the different considerations.

The GUI 220 enables selection of any suitable criteria for implementing the finite state machine 218. For example, a user may specify to maintain connectivity through a selected network resource, such as a NIC, in all conditions. The user can enable or disable an echo node. The user can enable or disable usage of path cost for determining a pathway for failover. Typically the GUI 220 can be used to implement the finite state machine 218 to make failover decisions based on multiple criteria, sequencing through a decision tree that is ordered according to user specifications. The finite state machine 218 can be periodically run to dynamically determine a best secondary pathway as conditions evolve.

The teaming drivers 210 operate a teaming mechanism whereby a team of network adapter ports can function as a single virtual adapter. Network devices 204 communicate with the team using one layer 2 address and one layer 3 address. A network device 204 "sees" only one layer 2 address such as a MAC address and one protocol address such as IP or IPX for a team regardless of the number of adapter ports that make up the team. For the IP protocol address of an Ethernet network, a team has only one entry in an ARP table, for example one MAC address and one IP address, for the entire team.

FIG. 2 illustrates primary components of an embodiment of a controller system installed on the computer system 200 that enables teaming of any number of NIC ports to create a single virtual or logical device. The depicted computer system 200 is configured with network resources 206 including four NICs N1-N4 and instantiations of associated drivers D1, D2, D3 and D4. Each instantiation of a driver D1 through D4 is the driver suitable to control each of the single-port NICs N1-N4. Drivers D1-D4 may be instances of the same driver if NICs N1-N4 are identical, or drivers D1-D4 may be different if associated NICs N1-N4 is also different.

An embodiment of a configuration application includes a graphical user interface (GUI) 220 through which users program configuration information regarding teaming of the NICs. The configuration application can also receive current configuration information from the teaming driver 210 that can be displayed to the user using the GUI 220, including resource status for the team from among the statuses "failed," "standby," and/or "active". GUI 220 supports commands by which resources can be allocated to teams and configured.

A hierarchy of layers within the operating system perform a distinct function and pass information between one another and enable communication with an operating system of another network device over the network. In an illustrative example, four layers can be added to the operating system including a Miniport interface (I/F) Layer 232, a Protocol I/F Layer 234, an Intermediate Driver Layer 230 and a Network Driver Interface Specification (NDIS). The Protocol I/F Layer 234 supplies protocol addresses, translates protocol addresses to MAC addresses, and forms an interface between protocol stacks 242, 244, and 246 and the NDIS layer. Drivers for controlling the network adapter or NIC ports reside at the Miniport I/F Layer 232. The NDIS layer in combination with the operating system handle communications between the Miniport Driver Layer 232 and the Protocol I/F Layer 234.

The multiple network adapters can be teamed by interposing an intermediate driver residing at the Intermediate Driver Layer 230 between the Miniport Driver Layer 232 and the NDIS. Intermediate drivers in the Intermediate Driver Layer 230 do not actually control any hardware but rather create a group of miniport drivers for each of the NIC ports to be teamed. The intermediate drivers cause NIC drivers of a team to appear to be one NIC driver controlling one NIC port. Prior to introduction of teaming and the intermediate driver layer 230, a protocol address typically was assigned to each individual network adapter or NIC driver at the Miniport Driver Layer 232. In contrast, for a teaming implementation, a single protocol address is typically assigned to each instance of the intermediate driver, assigning a single protocol address to each team. A separate instance of the intermediate driver at the Intermediate Driver Layer 230 is allocated for each team of NIC adapter ports, each instance being used to tie together NIC drivers that correspond to the NIC ports belonging to the team.

Accordingly, the intermediate driver 230 appears as a single NIC driver to each of the protocols 242-246. Also, the intermediate driver 230 appears as a single protocol to each of the NIC drivers D1-D4 and corresponding NICs N1-N4. The NIC drivers D1-D4 and the NICs N1-N4 are bound as a single team 250. Because each instance of the intermediate driver can be used to combine two or more NIC drivers into a team, a user may configure multiple teams of any combination of the ports of the NICs currently installed on the computer system 200. By binding two or more drivers corresponding to two or more ports of physical NICs, data can be transmitted and received through one of the two or more ports in the case of an NFT team, or transmitted through all of the two or more ports and received through one for a TLB team, with protocol stacks interacting with what appears to be only one logical device.

A fault tolerant team is typically used when throughput of a single NIC port is sufficient but fault tolerance is important. For example, the NIC ports supplying redundant links L1 through L4 to the network can be configured as a network fault tolerance (NFT) team. For an NFT team, one of the links, for example link L1 of a first port of a corresponding NIC N1, is initially designated to operate as the primary and is therefore "active." The assignment can be accomplished by default. For example, the teaming driver 230 simply chooses the team member located in the lowest numbered slot as the primary member. Assignment of the primary can also be accomplished by a user manually dictating the choice to the teaming driver 230 through the GUI. In the default example depicted, the second through fourth links of the team L2-L4 supplied by the ports P2-P4 by NICs N2 and N3) are configured to operate as "secondary" members and as such are placed in a "standby" mode.

Accordingly, the primary member transmits and receives all packets on behalf of the team. If the active link such as L1 fails or is disabled for any reason, the computer system 200 can detect the failure and switch to one of the secondary links by rendering to the active and primary link of the team while placing the failed link L1 in failed mode, designated as a secondary resource. The process is sometimes called "failover." Communication between computer system 100 and devices 104 in FIG. 1 is thereby maintained without significant interruption.

Figure 3A:
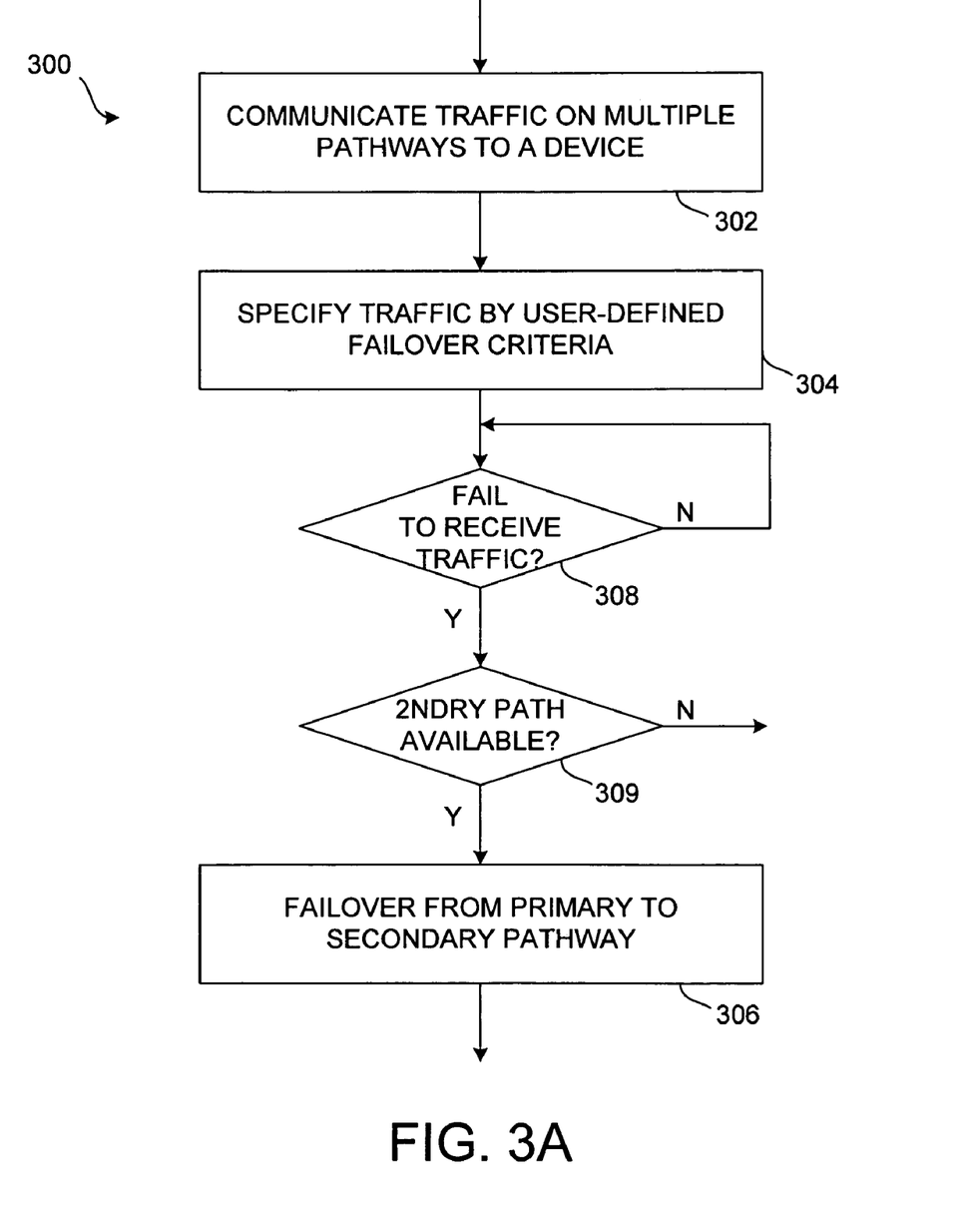
FIGS. 3A through 3D are schematic flow charts depicting an embodiment of a method for network path validation based on user-specified criteria.

FIGS. 3A through 3D are a set of schematic flow charts depicting an embodiment of a method for network path validation based on user-specified criteria. Referring to FIG. 3A, a method for operating a network computer system comprises managing failover 300 in the network computer system. Traffic is communicated 302 via a plurality of network resources that form a plurality of pathways to at least one network device. Traffic is specified 304 by a user that defines failover criteria. The method further comprises failing over 306 from a primary pathway to a secondary pathway of the multiple pathways based on failure 308 to receive the user-specified traffic defined by the failover criteria in the primary pathway in combination with availability 309 of the user-specified traffic via the secondary pathway.

Figure 3B:
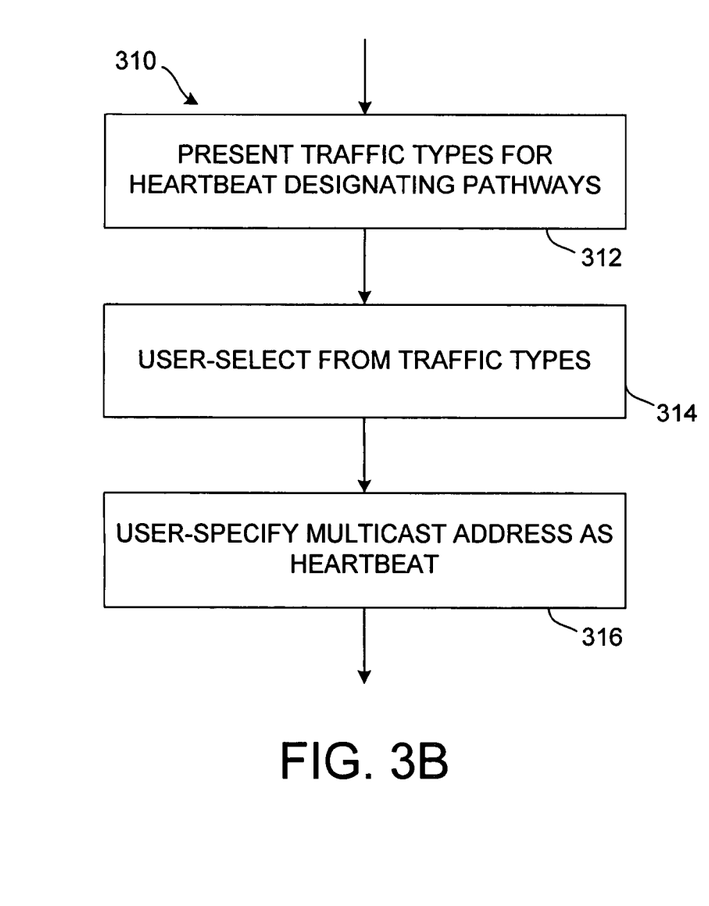

Referring to FIG. 3B, user-specification 310 of traffic that defines failover criteria can be implemented by presenting 312 multiple different traffic types for specifying a heartbeat indicating presence and/or absence of a signal indicative of failure in at least one of the pathways. Typically, the different traffic types are presented via a graphical user interface (GUI). The GUI enables 314 a user to select from among the traffic type plurality. In some embodiments, the GUI enables 316 a user to selectively specify a multicast address for usage as the heartbeat.

The illustrative teaming mechanism is implemented to maintain server connectivity to the network and is configurable by the server administrator to determine interactions among the teamed resources. One technique for teaming communication is usage of heartbeats, signals that are periodically multicast on the wire and monitored by team members. Heartbeats are sent to any devices registered at a specified multicast address and all registered network adapters monitor for the address, validate syntax, and acknowledge successful receipt. Heartbeat monitoring enables determination of whether a successful send and a successful receive take place within a designated time period, conditions that indicate a network adapter continues to function properly. An inability to successfully communicate heartbeats may indicate hardware failure, malfunction of a driver, inoperability of a switch port, and the like. Heartbeat failure may indicate inability to maintain network connectivity even before detection of a link failure.

If a teamed device is successfully sending data, then transmitting heartbeats may be superfluous since the sending device inherently has information that actual data was sent. Similarly, a receiving team member that receives data of any kind on the wire has sufficient information to validate a receive path on the network. Accordingly, heartbeats can efficiently be used to validate connectivity when actual data is not currently communicated.

Figure 3C:
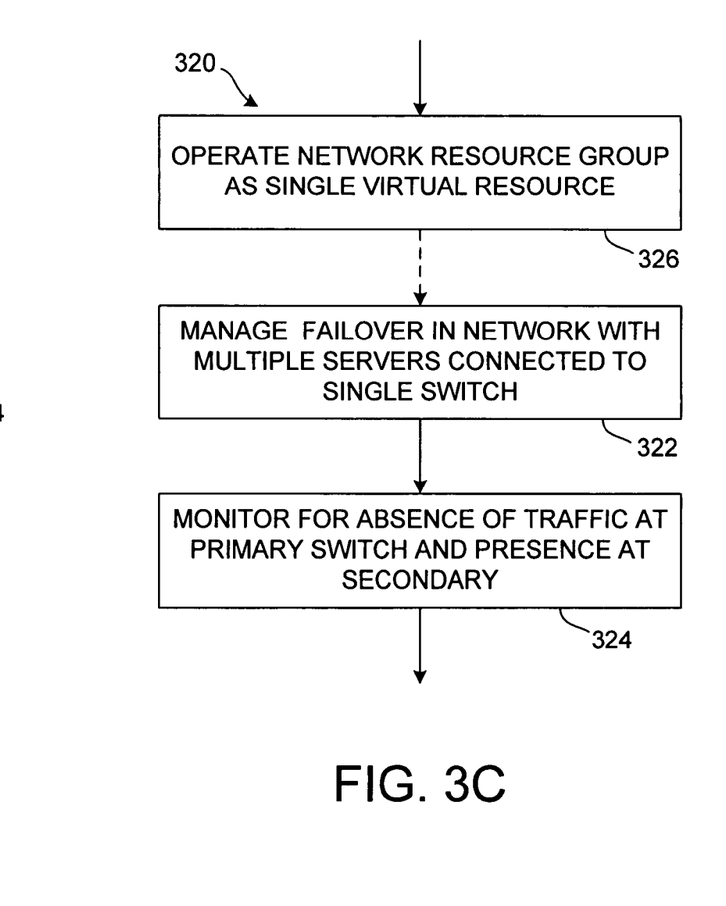

Referring to FIG. 3C, in some embodiments a method 320 for network path validation comprises managing 322 failover in the network computer system that comprises multiple servers connected to a first switch in the network resources. The method 320 further comprises monitoring 324 for absence of a user-specified traffic at the first switch in combination with presence of the user-specified traffic at one or more second switches. In some embodiments, at least a group of the network resources can be operated 326 as a single virtual network resource.

Figure 3D:
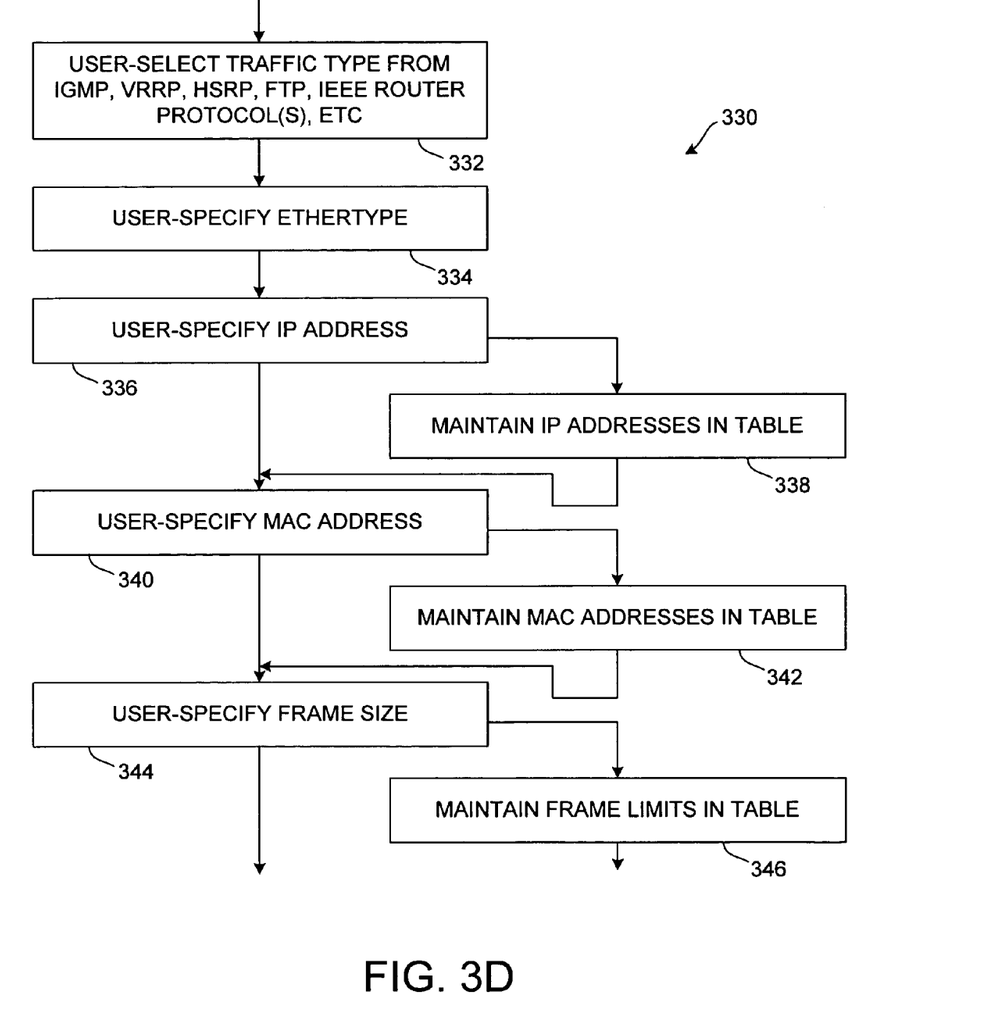

Referring to FIG. 3D, a method 330 may be implemented, for example using a graphical user interface (GUI), to enable failover criteria that can be used by a network adapter teaming system, for example Hewlett-Packard Adapter Teaming system, and thereby perform failover decisions. The failover criteria can be based on any of multiple sets of user-defined criteria. A particular embodiment may include five or more sets of user-defined criteria.

In a first set of user-criteria, a user is enabled 332 to selectively specify a traffic type selected from among a group including standard-specified traffic types such as Internet Group Management Protocol (IGMP), Virtual Router Redundancy Protocol (VRRP), Hot Standby Router Protocol (HSRP), spanning tree, File Transfer Protocol (FTP), or other Institute of Electrical and Electronics Engineers (IEEE) router protocols for usage as the heartbeat. The first set of criteria may be implemented with high flexibility in the GUI using a drop-down box to enable the user to maintain connectivity to the network based on router protocol for maintaining network connectivity. The selection can be registered in the intermediate driver monitor packet headers for the selected traffic type.

A second set of user-criteria can be a modification to a configuration GUI to enable 334 the user to specify an "EtherType" value that indicates the type of incoming traffic that satisfies a "receive test". The "EtherType" specification enables a manual technique for the user to choose the traffic type for usage as the heartbeat. Various types of EtherType indicators can be included in a field within the header of each packet. The intermediate driver can monitor the field in the packet header as each packet passes. EtherType headers can change depending on the type of packet. For example, Internet Protocol (IP), Transmission Control Protocol/Internet Protocol (TCP/IP), User Datagram Protocol (UDP), IPX, 802.2, and other traffic can have different EtherType headers and fields. The second set enables the user to specify some specific EtherType. If the user is not so much interested in a type of protocol but is rather interested in specifying a particular type of traffic, the second set enables parameters to be specified to monitor traffic rather than protocol. The second set of user-criteria can be used in place of the first set, or in combination with or as a subset or extension of the first set the GUI.

A third set of user criteria enables 336 a user to selectively specify an Internet Protocol (IP) address for validating a receive path for usage as the heartbeat. IP addresses can be maintained 338 in a table that enables checking when data frames are received. The GUI can be modified to enable input of IP addresses, such a multicast addresses and the like. A teaming driver or application can listen for the specified IP addresses to validate the receive path. The table that maintains the IP addresses can be checked when frames are received by an intermediate driver. The third set enables the user to select specific IP addresses in a manner similar to echo node selection, but does not apply for sending traffic out and expecting the traffic to return. If selected, so long as traffic is received from this specific IP address, connectivity is established. IP address specification is useful in conditions that a receiving team is registered for a particular multicast address for example for video streaming and the multicast address is known, the IP address is known from which the multicast is received, and traffic is received from the specific IP address, then the receive is validated. The validation remains in force so long as the specified traffic continues, but not if other traffic such as spanning tree traffic, IGMP traffic, router traffic, traffic from other servers, and the like is received. If the specified traffic terminates in a primary pathway, the intermediate driver determines whether the traffic is available from one or more secondary pathways and, if so, fails over to a selected secondary pathway, based on receipt of traffic from the specified IP addresses. Failover is typically not imposed immediately but rather after awaiting a selected time period, for example 1-10 seconds, after the specified traffic is no longer received. The time duration for failover can be used-selectable using the GUI 220.

A fourth set of user criteria enables 340 a user to selectively specify a Media Access Control (MAC) address for validating a receive path for usage as the heartbeat. The GUI can be modified to accommodate MAC addresses such as multicast addresses and the like. The teaming drivers and/or applications can monitor to MAC addresses to validate the receive path. The MAC addresses can be maintained 342 in a table that is checked when data frames are received by the intermediate driver. The fourth set of criteria is similar in implementation and function to the third set but enables the user to select a MAC address rather than an IP address. If the specified multicast MAC address is received on one adapter but not on the primary, then failover occurs.

A fifth set of user criteria enables 344 a user to selectively specify a maximum and/or minimum size frame for validating a receive path for usage as the heartbeat. The GUI can be modified to allow the user to input size frame limits that the teaming drivers monitor to validate the receive path. The frame size limits can be maintained 346 in a table to check when data frames are received, for example by an intermediate driver. The fifth set enables the user to enter a maximum or minimum frame size and is used, for example, to detect when a device is pinging a server. A ping is a very small packet, for example 64 byte frames. Pings can be used to maintain activity of the team by showing a capability to receive traffic. Selection of frame size ranges enables team activity for a particular type of data while ignoring traffic that is not useful.

The method can be extended to include additional sets of user-specified criteria. The method can also be configured to eliminate any of the first through fifth sets of user criteria, according to conditions and characteristics of a network implementation.

Selection among the multiple criteria sets can be implemented on the GUI with one check box that enables the concept in general and subset check boxes that enable one or more of the different set types. The GUI can also enable the user to select relative priority of the different set types. Accordingly, the finite state machine can manage failover based on a hierarchy of the different criteria sets.

In an example selection, the user can specify a first criterion that every team member can reach the echo node. The user can specify a second ranked criterion whereby path cost is selected so that failover will occur to pathways with a lower path cost. The finite state machine thus passes through a decision tree for each of the enabled features. Typically, for a tie condition for one feature, the decision tree analysis passes to the next feature in the hierarchy.

Multiple team members are attached to the network and implement the user-outlined failover criteria. The teaming driver monitors not only for a lack of traffic on the team member that is currently receiving, but also for other team members that can transmit, is currently active, and can actually receive the selected traffic type. Based on the selected hierarchy of data sets, the teaming driver does not monitor specifically for a type of data on the primary, but rather monitors for lack of the specified type of data on the primary, in combination with a capability to receive that type of data on a secondary pathway. Availability of other traffic that is not specified by the user, for example spanning tree packets, pings from another server, real data from a transfer taking place from some other machine to the server, is ignored by the teaming driver based on the user-selected criteria, for example as described in criteria sets 1-5.

In the pathway validation and failover technique, failover is based on a lack of received traffic rather than the positive receipt of traffic. Conventional techniques validate received traffic based on whether data is received and not whether a specific type of data is missing. In the disclosed technique, if the missing traffic is available from some other source, then failover occurs.

In an example implementation, an intermediate driver dissects incoming frames to inspect for a multicast heartbeat address. The illustrative technique for network path validation based on user-specified packet criteria can be implemented by supplementing operations of the intermediate driver with inspection of the multicast heartbeat address with a check against a table of user-specified criteria, typically with addition of only an insignificant amount of overhead. In a particular embodiment, a graphical user interface can be used to configure the table. The intermediate driver checks traffic against the table and, if the user-specified frame type is not received within a predetermined time frame, but another adapter in the team is receiving the user-specified frame, that information is considered for a failover decision.

Figure 4:
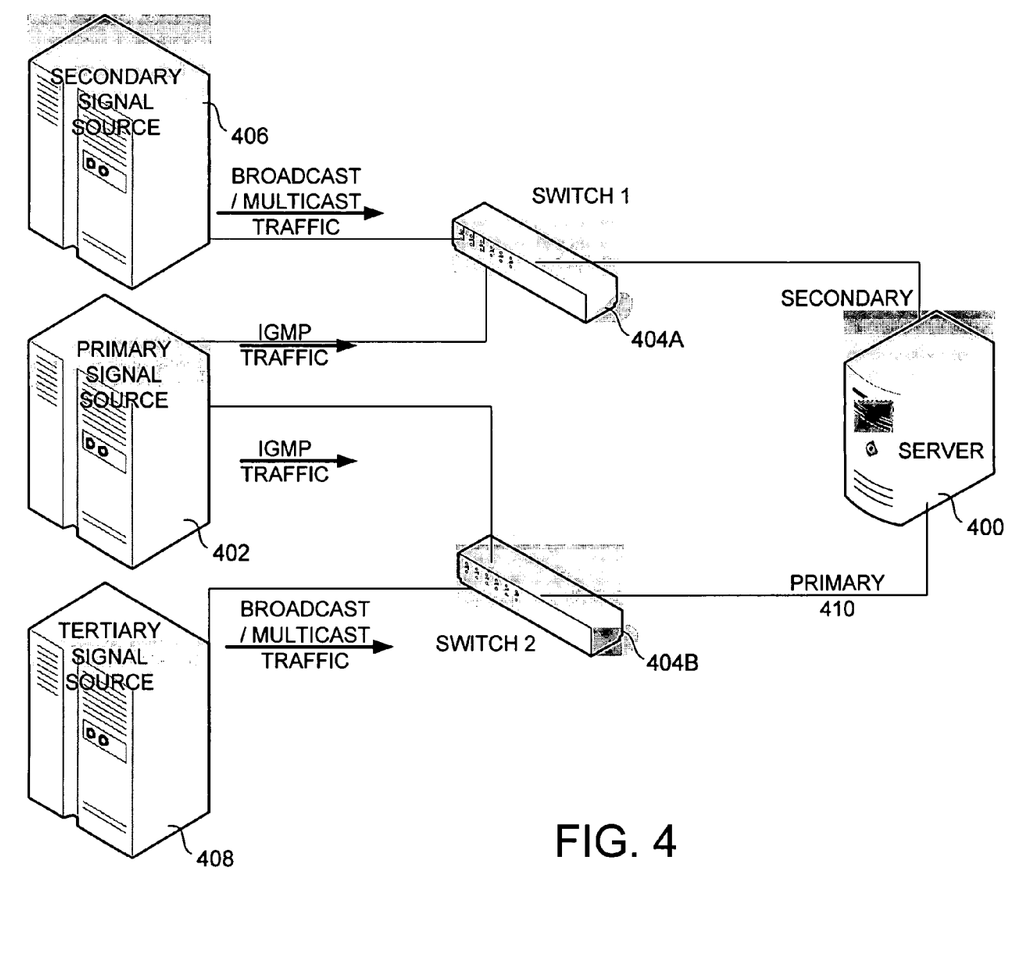
FIG. 4 is a schematic block diagram illustrates an embodiment of a network configuration to describe the operation of network path validation based on user-specified criteria.

Referring to FIG. 4, a server 400 is shown with a dual attachment to a source 402 via two different switches 404A and 404B. The same switches 404A, 404B can also be attached to multiple other devices 406, 408 that may create multicast or broadcast traffic. In one specific scenario, the system can be configured to ensure that a server 400 or servers remain connected to a signal source 402 through IGMP. If the source 402 becomes disconnected from a primary path 410 or cannot respond to a directed ARP, conventional failover mechanisms do not detect a problem until IGMP creates a failover.

During operation of network path validation based on user-specified criteria, if the primary signal source 402 is monitoring specifically for a specific type of traffic, for example IGMP traffic, and the specific type of traffic is not received, but the specified traffic is received on the secondary adapter 406, then the information is used as part of the criteria to make the failover decision.

The illustrative system and technique adds flexibility over typical failover techniques by enabling a user to select specific network traffic for monitoring and for inclusion in failover decisions. A capability to customize components such as a network adapter driver enables deployment in a wide variety of scenarios and conditions. A user can select the type of traffic that validates a teamed port's receive ability and enables the user to configure the teaming driver to more intelligently determine when an individual teamed port is in an error condition or to determine that no error condition exists.

In a specific example, the capability can be used in a server deployment to supply video over Digital Subscriber Line (DSL) technology. The system may restrict "receive validation" traffic to a specific multicast stream, specifically the video stream, within a teaming driver. Otherwise, server traffic could cause the teaming driver to mistakenly determine that pathways through all teamed ports were always good because all multicast streams could not be monitored at all times. The illustrative network validation technique enables the user to precisely specify failover conditions.

The video-over-DSL application is configured to verify connectivity in conditions that a team is connected if and only if a certain type of data is received. The network is made up of a server farm and operates as a team configured to execute video streaming. The team is arranged to ensure that a server is operative at all times and network resources in the team, for example a NIC A, is connected to receive data. If for any reason, data receipt at NIC A discontinues, then what is desired is failover to another network resource such as NIC B to enable receipt of data, continued streaming, and maintained connectivity of the server to the video stream. A difficulty with a typical teaming implementation is that, if NIC A continues to receive data of any type, connectivity is deemed to be valid even if the specific desired data is discontinued.

One difficulty with the typical teaming is described. For example, NIC A can continue to receive any data such as a video stream passing across the network and through a core switch, to an edge switch, and to the NIC, and a failure occurs further along the wire that stops video stream transmission out to the edge switch. The link failure would not be sensed if any other type of data were broadcast or multicast on the wire, for example any router updates, spanning tree updates, and the like, that would be detected as incoming data on a primary NIC. The link would be validated even if the desired data, in the illustrative example a video stream, is not received. Failover would not occur and that the desired type of data is missing would not be realized.

Accordingly, the illustrative system and technique for network path validation based on user-specified criteria, enables a user to specifically designate a particular type of frame on the network, for example to monitor for a specific type of data, a particular header type, data of a selected size, a particular EtherType, and the like, and to failover if the selected type of data is not received within a specified timer period. If the user-specified data is available on a secondary pathway of the network, for example on a secondary NIC that is connected to the team, then failover to the secondary NIC takes place and data transmission continues.

The illustrative system can include an intermediate driver that monitors frames that are received and checks the frames for the specified traffic type for every pathway that is connected to the intermediate driver. If the type of traffic is not received on a primary pathway and the user has specified a desire to remain connected to that traffic type if otherwise available, then the intermediate driver checks for the traffic type on secondary pathways, and fails over to a secondary pathway that carries the specified traffic. The user is thus enabled to have an additional level or layer of intelligence to select the precise type of traffic desired, as well as control over the selection of the pathway to which failover occurs.

The various functions, processes, methods, and operations performed or executed by the system can be implemented as programs that are executable on various types of processors, controllers, central processing units, microprocessors, digital signal processors, state machines, programmable logic arrays, and the like. The programs can be stored on any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A computer system comprising:
   at least one processing resource configured to control and communicate with at least one network device;
   a plurality of network resources configured to be coupled by a plurality of pathways between the at least one processing resource and the at least one network device; and
   at least one teaming module executable on the at least one processing resource and configured to manage failover in the computer system, wherein the at least one teaming module is configured to:
   present a user interface enabling selection from among plural different traffic types to use as a heartbeat, where absence of the heartbeat is an indication of failure, the plural different traffic types including multiple ones selected from among a traffic type defined by a specific protocol, a traffic type defined by a specific Internet Protocol (IP) address, and a traffic type defined by a specific Media Access Control (MAC) address;
   receive an indication of a selected user-specified traffic type from among the plural different traffic types to use as the heartbeat;
   communicate traffic via the plurality of network resources; and
   make a decision to fail over from a primary one of the pathways to a secondary one of the pathways based on failure to receive the heartbeat according to the user-specified traffic type, in combination with detection of availability of traffic according to the user-specified traffic type via the secondary pathway.

2. The computer system according to claim 1 further comprising:
a plurality of servers configured to be connected to a first switch, where the at least one teaming module is configured to further:
monitor for absence of the heartbeat according to the user-specified traffic type at the first switch in combination with presence of traffic according to the user-specified traffic at one or more second switches, and
manage failover from the first switch to a second switch of the one or more second switches that is selected based on user-specified criteria.

3. The computer system according to claim 1, wherein the user interface is configured to specify a hierarchy of user-specified traffic types, the hierarchy determining a secondary pathway from among a plurality of secondary pathways eligible for failover.

4. The computer system according to claim 1, wherein the user interface is a graphical user interface.

5. The computer system according to claim 1 further comprising:
a finite state machine configurable by a user to execute a multiple-variant analysis to select the secondary pathway from among a plurality of potential pathways for failover from the primary pathway.

6. The computer system according to claim 1, wherein the user interface is a graphical user interface (GUI) configured to present the traffic type defined by the specific protocol, the traffic type defined by the specific IP address, and the traffic type defined by the specific MAC address.

7. A method of operating a network computer system comprising:
presenting, in a user interface, information relating to a plurality of different traffic types for specifying a heartbeat, where absence of the heartbeat is an indication of failure, the plurality of different traffic types including multiple ones selected from among a traffic type defined by a specific protocol, a traffic type defined by a specific Internet Protocol (IP) address, a traffic type defined by a specific Media Access Control (MAC) address, and a traffic type defined by a predetermined maximum or minimum size;
enabling a user to select, with the user interface, from among the plurality of different traffic types to use as the heartbeat; and
managing failover in the network computer system comprising:
receiving an indication of a selected traffic type from among the plurality of different traffic types to use as the heartbeat;
communicating traffic via a plurality of network resources that form a plurality of pathways to at least one network device; and
making a decision to fail over from a primary one of the pathways to a secondary one of the pathways based on failure to receive the heartbeat according to the selected traffic type in the primary pathway, in combination with detecting availability of traffic according to the selected traffic type via the secondary pathway.

8. The method according to claim 7 further comprising:
managing failover in the network computer system comprising a plurality of servers connected to a first switch;
monitoring for absence of the heartbeat according to the selected traffic type at the first switch in combination with presence of traffic according to the selected traffic type at one or more second switches; and
managing failover from the first switch to a second switch of the one or more second switches that is selected based on user-specified criteria.

9. The method according to claim 7 further comprising:
operating at least a group of the plurality of network resources as a single virtual network resource.

10. A computer system comprising:
at least one processing resource configured to control and communicate with at least one network device;
a plurality of network resources configured to be coupled by a plurality of pathways between the at least one processing resource and the at least one network device; and
a graphical user interface (GUI) executable on the at least one processing resource and configured to:
present a plurality of types of traffic useable as a heartbeat, wherein the plurality of types include a first type of traffic defined by a specific protocol, and a second type of traffic defined by a specific multicast address; and
receive user selection of one of the presented plurality of types of traffic to use as the heartbeat; and
a failover mechanism to control failover from a primary one of the pathways to a secondary one of the pathways based on failure to receive the heartbeat according to the selected type of traffic in the primary pathway.

* * * * *